United States Patent [19]

Wehmeyer et al.

[11] Patent Number: 5,682,206
[45] Date of Patent: Oct. 28, 1997

[54] CONSUMER INTERFACE FOR PROGRAMMING DEVICE

[75] Inventors: Keith Reynolds Wehmeyer, Fishers; Robert Howard Miller, Indianapolis, both of Ind.

[73] Assignee: Thomson Consumer Electronics, Inc., Indianapolis, Ind.

[21] Appl. No.: 533,958

[22] Filed: Sep. 25, 1995

[51] Int. Cl.⁶ .................................................. H04N 5/445
[52] U.S. Cl. ........................ 348/563; 348/731; 348/570; 348/906
[58] Field of Search ........................ 348/731, 734, 348/725, 906, 563, 569, 570, 6, 13; 358/335; 455/171.1; H04N 5/76

[56] References Cited

U.S. PATENT DOCUMENTS

5,047,867  9/1991  Strubbe et al. ..................... 348/564
5,450,135  9/1995  Schick ............................... 348/732
5,479,266  12/1995  Young et al. ...................... 358/335

Primary Examiner—Michael H. Lee
Attorney, Agent, or Firm—Joseph S. Tripoli; Peter M. Emanuel; Robert D. Shedd

[57] ABSTRACT

A television system for receiving a plurality of television programs includes a programming unit for causing the television system to receive and record a particular television show aired on a given channel, at a particular time and date in accordance with schedule data entered by a user. The television system includes a controller for generating the on-screen displays in response to user-entered data. Upon completion of a programming entry, the controller causes a display of a substantially grammatically correct sentence summarizing the entered programming instructions and acting as a confirmation screen. In one embodiment, the confirmation screen is interactive in that certain variables within the sentence may be modified by the user to change the sense of the sentence, and thus to modify the programming instructions.

10 Claims, 7 Drawing Sheets

PROGRAM GUIDE

CH 150 — 7:05pm

| | 7:00pm | 7:30pm | 8:00pm | 8:30pm |
|---|---|---|---|---|
| HBO 102 | OTHER PEOPLE'S MONEY | | FREE PREVIEW | DREAM ON |
| CBS 106 | EVENING NEWS | FRANNIE'S TURN | BROOKLYN BRIDGE | RAVEN |
| UPN 113 | STAR TREK: VOYAGER | | ENTERTAINMENT TONIGHT | STAR TREK: VOYAGER |
| CINE 210 | EYEWITNESS | FUN CITY | | DOUBLE TROUBLE |
| CNN 305 | PRIME NEWS | BOTH SIDES | RELIABLE SOURCES | WORLD NEWS |
| USA 422 | COUNTER STRIKE | | QUANTUM LEAP | |

| MORE | MOVIES | SPORTS | OTHER | ALL | EXIT |

CONSUMER INTERFACE FOR PROGRAMMING DEVICE

FIELD OF THE INVENTION

This invention is related to the field of on-screen display generation for programming or scheduling systems for television receivers including VCRs, and for other timer operated appliances and devices. With respect to television systems, the invention is mainly described with reference to a digital satellite television system, but is equally applicable to such systems as a cable system, terrestrial broadcast system, or a communication system which utilizes telephone lines. With respect to other household appliances, the use of the screen displays to control such items as garage door openers, thermostats, and lights, is envisioned.

BACKGROUND OF THE INVENTION

It is notoriously well-known that many people have great difficulty in programming their television receiver schedulers and VCRs to receive and record a particular desired television program. The consumer electronics industry has attempted to correct this problem in a variety of ways over the past few years, with varying degrees of success.

In particular, it is felt that, typical text-style timer programming screens may be suitable for use by computer programmers and engineers, but may appear too intimidating for non-technical consumers. Remote control units having thumbwheel-style data entry for use by a user to fill-in-the-blanks in a programming schedule are known, but require the user to associate the act of rotating a thumbwheel located on the remote control with the appearance of data in a particular location on a television screen across the room. For some users, this task may seem insurmountable. A graphical screen display of a matrix of currently-running or imminent television shows from which a "point and click" selection may be made, is a recent improvement, but it lacks feedback of some sort to assure the user that all has been programmed correctly. In short, users are still not comfortable with the programming process, perhaps, because the electronic equipment communicates with them in an awkward and unfamiliar manner.

SUMMARY OF THE INVENTION

In a first embodiment of the invention, a television system for receiving a plurality of television programs includes a programming unit for causing the television system to receive and record a particular television show aired on a given channel, at a particular time and date in accordance with schedule data entered by a user. The television system includes a controller for generating the on-screen displays in response to user-entered data. Upon completion of a programming entry, the controller causes a display of a substantially grammatically correct sentence summarizing the entered programming instructions and acting as a confirmation screen. In a second embodiment, the confirmation screen is interactive in that certain parts of speech of the sentence are variables which may be modified by the user to change the sense of the sentence, and thus to modify the programming instructions. In yet another embodiment of the invention, other electronic appliances or devices such as, lamps, thermostats, and garage door openers are controlled in accordance with the principles of the invention.

DETAILED DESCRIPTION OF THE DRAWING

Figure 1:
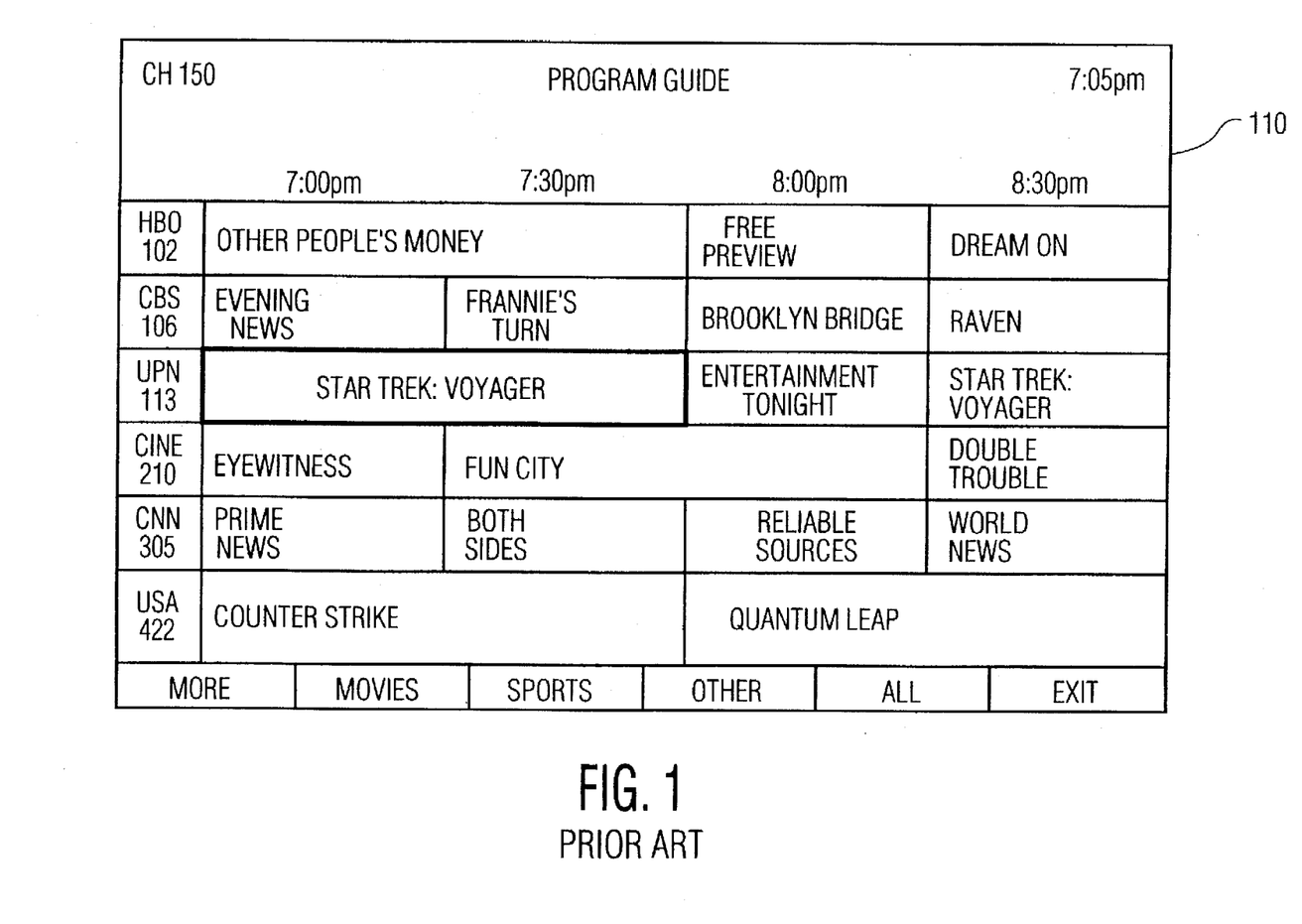
FIG. 1 is an illustration of a program guide screen display known from the prior art, and suitable for use with the invention.

FIG. 1 shows a Program Guide screen display produced, for example, by an RCA® DSS® direct broadcast satellite receiver system, manufactured by Thomson Consumer Electronics, Inc. Indianapolis, Ind. A user selects a television program from a Program Guide for viewing, by moving a cursor (via operation of remote control up, down, right, and left, direction control keys, not shown) to a block of the program guide screen display which contains the name of the desired program. When a SELECT key of the remote control is pressed, the current x and y position of the cursor is evaluated to derive virtual channel and program time information. In this example, a particular television show, STAR TREK: VOYAGER has been highlighted for selection by use of the cursor keys on a remote control unit (e.g., 450R of FIG. 4). The highlighting is illustrated by the dark box outlining the title in FIG. 1. Upon pressing the select key, the relevant programming data is transferred to a programming unit.

At first glance, the television program selection process described above appears easy and foolproof. Nevertheless, an undesired program can be recorded if the user inadvertently highlighted the wrong program box. The probability of occurrence of such a mistake is not too farfetched when one considers that there are certain programs that are repeated at different times of the day, and on different days (as shown by the second appearance of STAR TREK: VOYAGER in the channel guide on channel 113 at 8:30 pm. Thus, a user may have selected the proper title but may have inadvertently selected its occurrence at an undesired time or on an undesired day.

Figure 2:
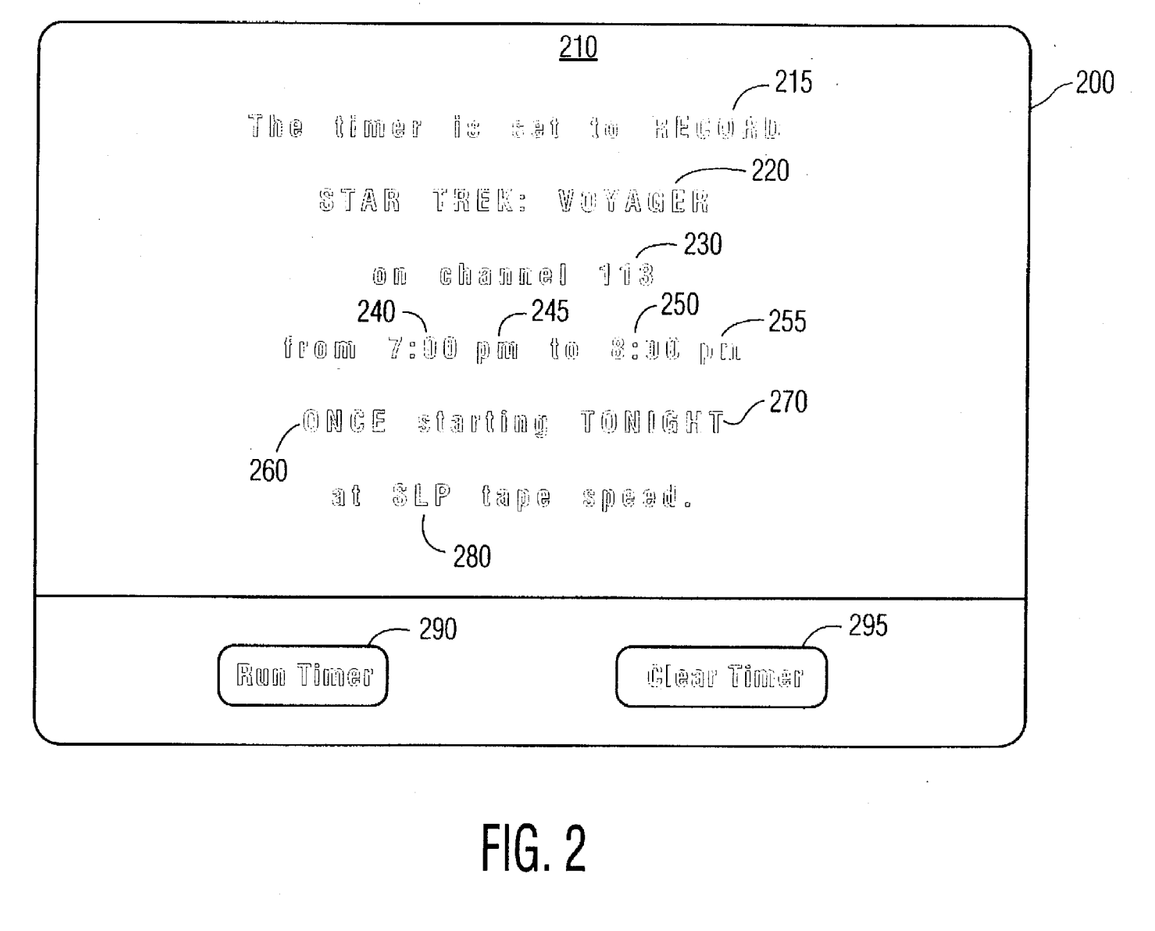
FIG. 2 is an illustration of a confirmation sentence displayed in accordance with a first embodiment of the invention.

The subject invention will now be described with reference to the displays on television screens 200 and 300 of FIGS. 2 and 3. Upon pressing the SELECT key of the remote control unit, apparatus according to the subject invention forms and displays a substantially grammatically-correct sentence 210, shown in FIG. 2, which summarizes the programming instructions which are to be executed for recording the selected television show. The data for this confirmation screen is written in complete sentence form in order to be easily understood by non-technical users, who are felt to be much more comfortable communicating in complete sentence form, than reading a list of entered data. The "fixed" (i.e., non-variable) portions of the sentence, such as the phrase "the timer is set to" are stored in read-only memory (ROM) (which may be included within microprocessor 415R of FIG. 4). Alternatively, the sentence may be built "on-the-fly" by obtaining the data for each word from auxiliary data transmitted with television signal. The sentence includes the action to be accomplished (i.e., WATCH or RECORD) 215, the title of the television show 220, the channel carrying the show 230, the starting time 240, 245, the ending time 250, 255, the frequency of recording 260 (e.g., record ONCE), and the day or date 270 (e.g., Tonight). If the user agrees that the confirmation sentence correctly expresses his programming intention, then he uses the cursor keys to transmit X and Y coordinate information to a microcontroller to cause the micro controller to highlight the RUN TIMER "soft button" (or "soft key") 290 displayed near the bottom of screen 200. The user then presses the SELECT key on his remote control unit to transmit his acceptance of the programming instructions. If, however, the confirmation sentence does not correctly express his programming intention, then he uses the cursor keys to highlight the CLEAR TIMER "soft button" 295 displayed near the bottom of screen 200, and presses the SELECT key on his remote control unit to return to the screen display of FIG. 1.

Figure 3:
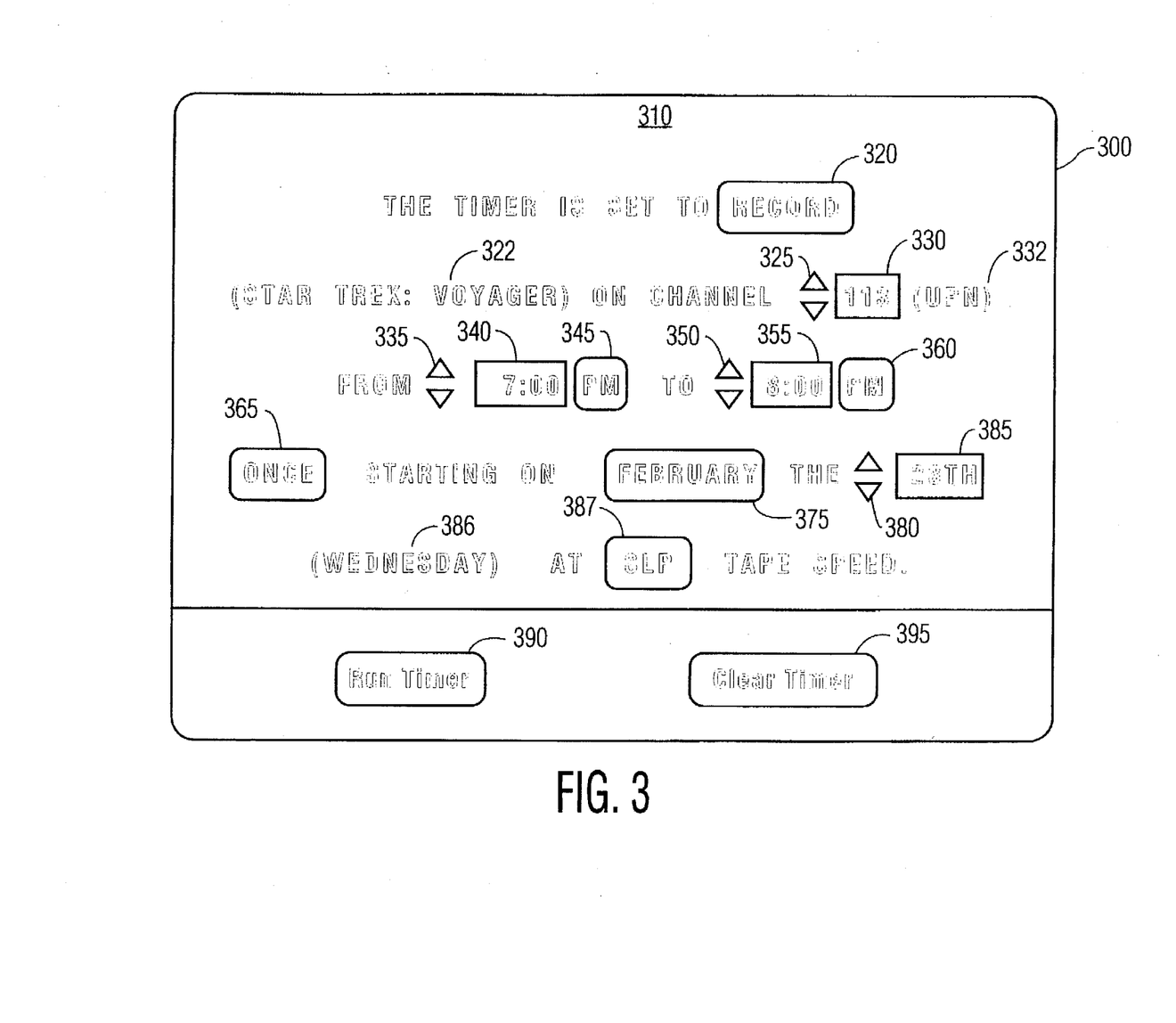
FIG. 3 is an illustration of an interactive confirmation sentence displayed in accordance with a second embodiment of the invention.
Figure 5:
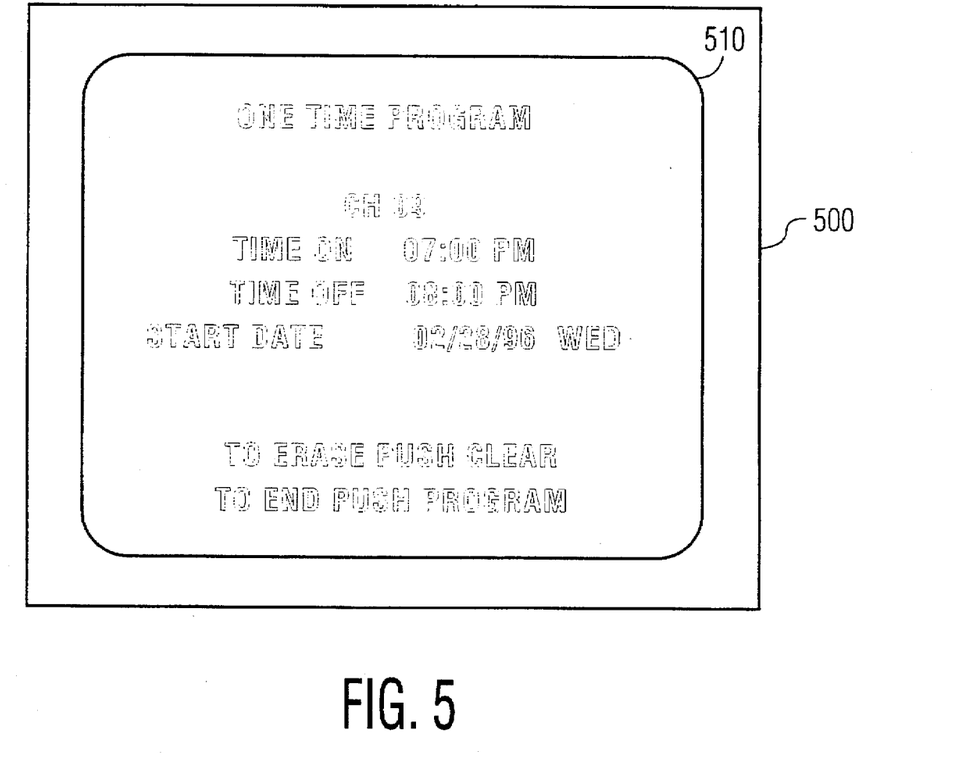
FIG. 5 is an illustration of a timer program screen display known from the prior art, and suitable for use with the invention.

In a second embodiment of the invention, shown in FIG. 3, the confirmation sentence is interactive, which means that the user may modify the sentence to change the sense of it, and thereby change the programming instructions. A television screen 300 has a confirmation sentence 310 displayed on it. The data to fill in the confirmation sentence may have come from a display similar to that of FIG. 1, or it may have been entered by means of a standard timer recording screen display, as shown in FIG. 5.

Those items in sentence 310 which are enclosed by a rounded rectangle such as, items 320, 345, 360, 375, and 387, are soft buttons which if selected toggle to a different function or label. For example, item 320 is a verb which toggles between RECORD and WATCH, by way of an access by microprocessor 415R of FIG. 4 of a portion of ROM containing the appropriate word. Items 345 and 360 are time of day modifiers which toggle between am and pm. Item 375 is a Time Period indicator incremented or decremented by use of soft arrow keys 370. Time Period indicator 375 may show the individual months, the day of the week, or such useful, and user-friendly entries as, Today, Tonight, Tomorrow, or Tomorrow night. Item 387 is an adjectival phrase modifying the tape speed which changes between SLP (super long play), LP (long play), and SP (standard play), at the user's choice.

Those items in sentence 310 which are enclosed by a standard rectangle such as, items 330, 340, 355, and 385, are items which may be changed by means of associated "arrow soft keys" 325, 335 350, 370 and 380 graphically located near the item to be changed, or by direct data entry. The soft arrow keys are activated by highlighting a desired one of them by using the cursor keys of the remote control unit, and pressing the select key. For example, item 330 is a channel number indicator which is incremented or decremented by use of soft arrow keys 325. Items 340 and 355 are time of day indicators incremented or decremented by use of soft arrow keys 335 and 350, respectively. The Title block 322, Broadcast Station Identifier 332, and Day of the Week indicator 386, enclosed in parentheses, are automatically changed in response to a change of channel, time, or date, to reflect the actual day, program and station to be tuned or recorded if the instructions of the currently displayed sentence are executed.

If the user agrees that the confirmation sentence as newly modified correctly expresses his programming intention, then he uses the cursor keys to highlight the RUN TIMER "soft button" (or "soft key") 390 displayed near the bottom of screen 300, and presses the SELECT key on his remote control unit to accept the programming instructions. If, however, the confirmation sentence does not correctly express his programming intention, then he may continue to edit the sentence as described above, or he may use the cursor keys to highlight the CLEAR TIMER "soft button" 395 displayed near the bottom of screen 300, and then press the SELECT key on his remote control unit to return to the screen display of FIG. 1.

Figure 4:
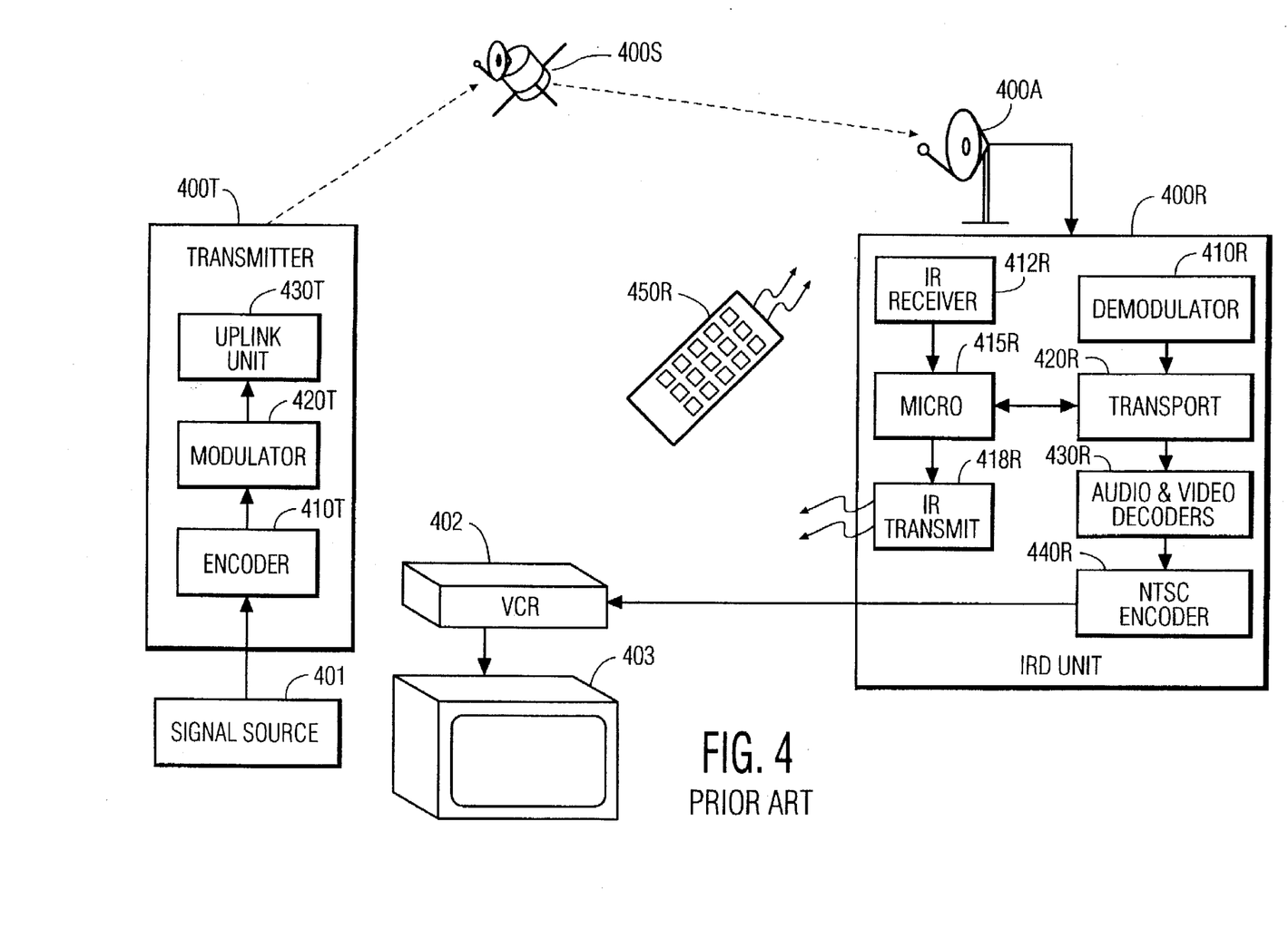
FIG. 4 is a simplified block diagram of a satellite transmitting/receiving system suitable for use with the invention.

As noted above, the channel guide data used by the controller of the subject apparatus to form the above-described interactive or confirmation sentences may be received from a satellite television communication system. FIG. 4 shows such a satellite television communication system in which, a satellite 400S receives a signal representing audio, video, or data information from an earth-based transmitter 400T. The satellite amplifies and rebroadcasts this signal to a plurality of receivers 400R, located at the residences of consumers, via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence.

In a such a satellite system, the information necessary to select a given television program is not fixedly-programmed into each receiver but is rather is down-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by a particular transponder. In such a system, it is not possible to tune any channel until the first master program guide is received from the satellite, because the receiver (IRD, or Integrated Receiver Decoder) literally does not know where any channel is located, in terms of frequency and position (i.e. data time slot) within the data stream of any transponder.

A master program guide is preferably transmitted on all transponders with the television program video and audio data, and is repeated periodically, for example, every 2 seconds. The master program guide, once received, is maintained in a memory unit in the receiver, and updated periodically, for example every 30 minutes. Retention of the master program guide allows instantaneous television program selection because the necessary selection data are always available. If the master program guide were to be discarded after using it to select a television program, then a delay of at least two seconds would be incurred while a new program guide was acquired, before any further television program selections could be performed.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver. If the SCID of a particular packet does not match the SCID of the desired television program as listed in the program guide, then that data packet is discarded.

A brief description of system hardware, suitable for implementing the above-described invention, now follows. In FIG. 4, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 410R to demodulate the signal and to decode the error correction data, an IR receiver 412 for receiving IR remote control commands, a microprocessor 415R, which operates interactively with demodulator/FEC unit 410R, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403. Microprocessor (or microcontroller, or microcomputer) 415R receives infrared (IR) control signals from remote control unit 450R, and sends control information to VCR 402 via an IR link 418R. Microprocessor 415R also generates the on-screen display (OSD) signals needed for presenting the interactive sentence, or confirmation sentence, to the user. Microprocessor 415R also receives and interprets cursor key X and Y information in order to control the highlighting of user choices in the on-screen displays.

FIG. 5 is an illustration of a standard VCR timer screen display wherein the channel number, on-time, off-time, and date are entered by the user by pressing keys of the remote control unit. In such a system, the confirmation sentence of FIG. 2, and the interactive sentence of FIG. 3 can still be used but the title information will be absent. It is noted that day of the week information can be derived from the complete date in a known fashion and displayed, if desired.

Figure 6:
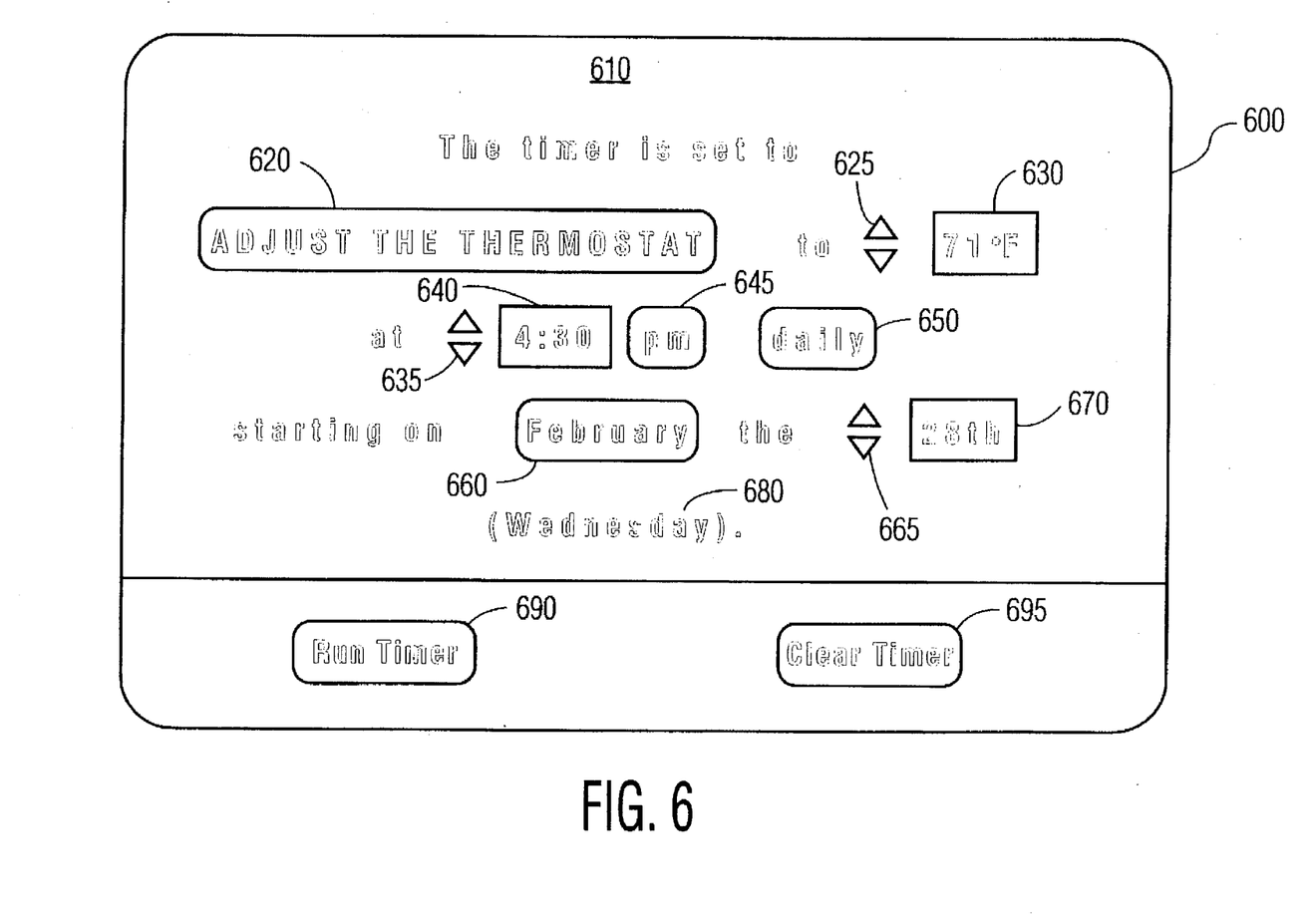
FIG. 6 is an illustration of an interactive confirmation sentence displayed in accordance with another embodiment of the invention.

It is envisioned that the teachings of the present invention may be applied to the control of other devices than those which are television-related. In this regard, FIG. 6 shows an interactive sentence used for controlling a thermostat. It is envisioned that soft button 620 may be "pressed" to change devices to be controlled. For example, a garage door may be controlled to open at a certain time, a lawn sprinkler controlled to water the lawn, or a lamp may be controlled to turn on or off, via the interactive sentence of FIG. 6. In the same way that the control parameters (i.e., modifiable parts of speech) of the interactive sentence of FIG. 4 are changed, the temperature parameter 630 of FIG. 6 may be set by use of soft arrow keys 625 or direct entry of a temperature setting.

Figure 7:
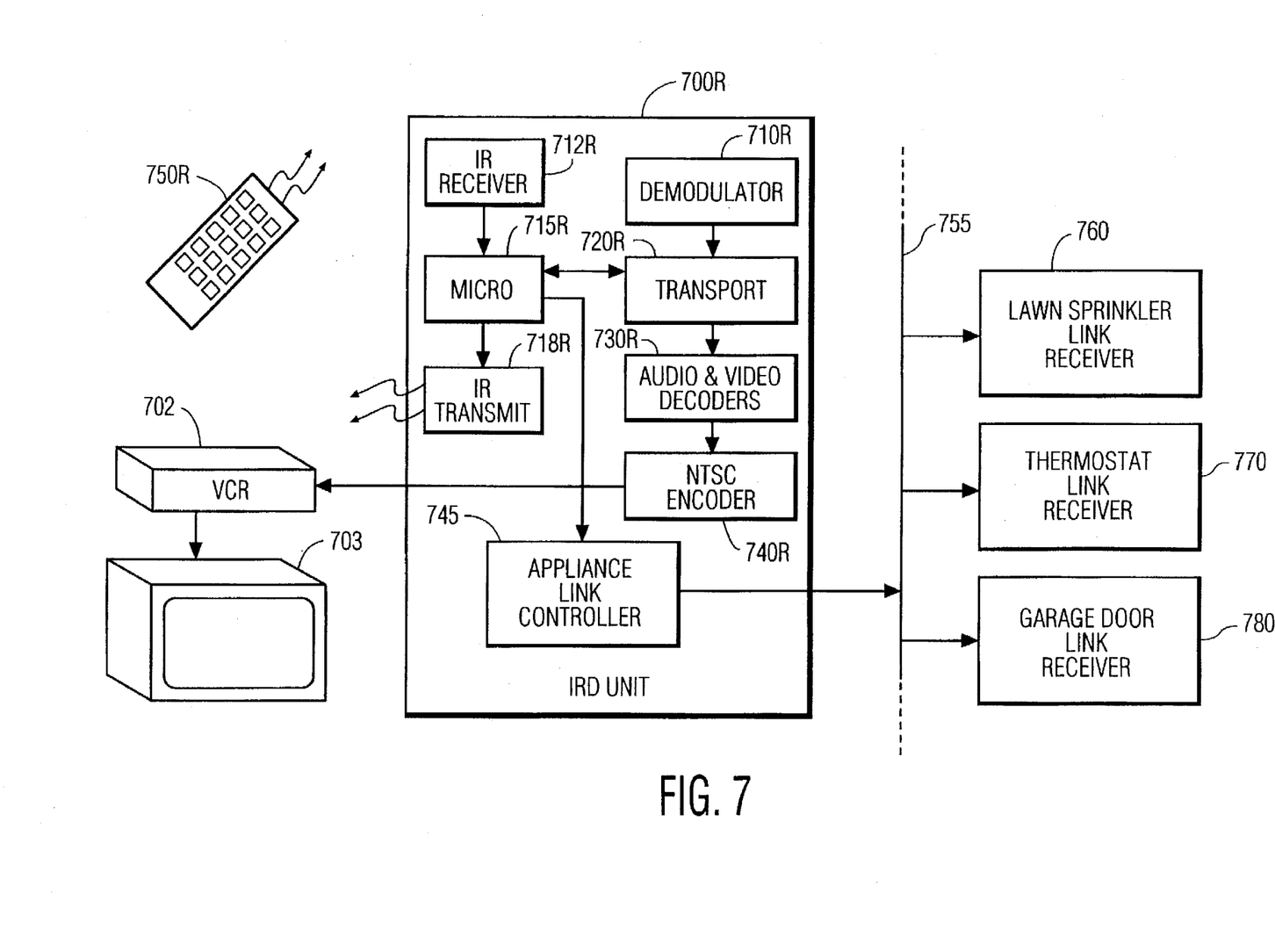
FIG. 7 is a simplified block diagram of a portion of satellite receiver system suitable for use with the embodiment of the invention, shown in FIG. 6.

Apparatus for controlling representative devices is shown in FIG. 7, wherein items bearing similar reference numbers to those of FIG. 4 serve the same function and need not be described again. IRD unit 700R includes an APPLIANCE LINK CONTROLLER 745R for encoding appliance control commands in the proper format for transmission via a transmission link 755. Transmission link may be any of a hard-wired bus, an RF link (i.e., a radio frequency transmission path), an IR link (i.e., an infrared transmission path), or an FM signal impressed on the house AC wiring, or other suitable transmission link. Each of units 760, 770, and 780 include suitable decoding circuitry to allow each to receive its particular control signals, and perform its individual function. Such circuitry is well-known in the art, for example from U.S. Pat. No. 4,386,431, entitled TELEVISION REMOTE CONTROL SYSTEM FOR SELECTIVELY CONTROLLING A PLURALITY OF EXTERNAL APPARATUS THROUGH THE AC POWER LINE (Kocher, et al), issued 31 May 1983, and from U.S. Pat. No. 4,392,822, entitled TELEVISION REMOTE CONTROL SYSTEM FOR SELECTIVELY CONTROLLING A PLURALITY OF EXTERNAL APPARATUS (Carlson), issued 5 Jul. 1983, both of which are herein incorporated by reference.

What is claimed is:

1. A programming apparatus in a television system, comprising:

input means for receiving a television signal;

programming means for coupled to said input means and to a control means for entering data for scheduling the selection of a television event in the future; and on-screen display means operating under control of said control means for displaying data indicative of said television event scheduled to be selected in the future;

upon completion of said scheduling of said event, said on-screen display means displays a confirmation screen display showing instructions entered for said scheduled event in the form of a substantially grammatically correct sentence containing various parts of speech representing variables in the programming instructions, and also showing user-selectable icons located within said substantially grammatically correct sentence; and means for modifying ones of various parts of speech of said substantially grammatically correct sentence, in response to selection of one of said user-selectable icons, to change the sense of the sentence, and thereby change the programming instructions.

2. A programming apparatus in a television system, comprising:

a television signal input for receiving a plurality of television signals;

television signal selection means for selecting a particular television signal from said plurality of television signals;

input means for entering data by a user;

control means for controlling said selection means in response to said user enter data;

programming means for coupled to said input means and to said control means for entering data for scheduling the selection of a given television event in the future; and on-screen display means operating under control of said control means for displaying data indicative of said television event scheduled to be tuned in the future;

upon completion of said scheduling of said event, said on-screen display means displays a confirmation screen display showing said instructions entered for said scheduled event in the form of a substantially grammatically correct sentence, and also showing user-selectable icons located within said substantially grammatically correct sentence; and means for modifying ones of various parts of speech of said substantially grammatically correct sentence, in response to selection of one of said user-selectable icons, to change the sense of the sentence, and thereby change the programming instructions.

3. The programming apparatus of claim 1, wherein said television system is a satellite television receiver, said television scheduling data is provided by a satellite television service provider, and said user selects a desired television show from a displayed channel guide display generated in accordance with said television scheduling data.

4. The programming system of claim 3 wherein, said various parts of speech of said substantially grammatically correct sentence which are modifiable include nouns, adverbs, and verbs, indicative of a channel designation, date, and time.

5. The programming system of claim 4 wherein, said various parts of speech of said substantially grammatically correct sentence which are modifiable include nouns, adverbs, and verbs, indicative of television show title, frequency of recording such as weekly, daily, or once, and an action such as watch or record.

6. The programming apparatus of claim 2, wherein said television system is a broadcast television receiver, said television scheduling data is provided on certain television lines during the vertical interval of a given television program, and said user selects a desired television show from a displayed channel guide display generated in accordance with said television scheduling data.

7. The programming system of claim 2 wherein, said various parts of speech of said substantially grammatically correct sentence which are modifiable include nouns, adverbs, and verbs, indicative of a channel designation, date, and time.

8. The programming system of claim 7 wherein, said various parts of speech of said substantially grammatically correct sentence which are modifiable include nouns, adverbs, and verbs, indicative of television show title, frequency of recording such as weekly, daily, or once, and an action such as watch or record.

9. A scheduling apparatus for a device, comprising:

programming means for entering data for scheduling the operation of a device in the future; and control means for generating control signals and for generating signals suitable for displaying data indicative of said device scheduled to be operated in the future;

said control means, upon completion of said scheduling said device to operate in the future, generates a signal suitable for displaying a confirmation screen display showing instructions entered for said scheduling of said device to operate in the future in the form of a substantially grammatically correct sentence, and also showing user-selectable icons located within said substantially grammatically correct sentence; and means for modifying ones of various parts of speech of said substantially grammatically correct sentence, in response to selection of one of said user-selectable icons, to change the sense of the sentence, and thereby change the programming instructions.

10. The scheduling apparatus of claim 7 wherein, said device is a household appliance, and said substantially grammatically correct sentence is modifiable to adjust parameters for controlling said appliance.

* * * * *